United States Patent [19]

Ashman et al.

[11] 4,100,075
[45] Jul. 11, 1978

[54] SILANE TREATED ANTIMONY COMPOUNDS

[75] Inventors: John Slocum Ashman, Euclid; Anton Mudrak, Broadview Heights, both of Ohio

[73] Assignee: The Harshaw Chemical Company, Cleveland, Ohio

[21] Appl. No.: 809,226

[22] Filed: Jun. 23, 1977

[51] Int. Cl.² .................................................. C09K 3/28
[52] U.S. Cl. .............................. 252/8.1; 260/45.75 B; 260/DIG. 24
[58] Field of Search .................. 252/8.1; 260/45.75 B, 260/DIG. 24

[56] References Cited

U.S. PATENT DOCUMENTS 3,810,864  5/1974  White et al. .......................... 252/8.1

Primary Examiner—Leland A. Sebastian

Attorney, Agent, or Firm—Armand P. Boisselle

[57] ABSTRACT

Finely divided particulate inorganic antimony compounds which are surface modified with up to about 5% by weight of an organosilane having the formula

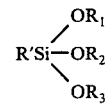

wherein $R_1$, $R_2$ and $R_3$ are each independently hydrogen, lower alkyl, lower alkenyl, alkoxyalkyl aryl, lower alkylaryl, or lower arylalkyl groups, and R' is an organo functional group are described. These surface modified antimony compounds may be incorporated into various organic resin and elastomer systems to improve the flame-retardant properties of these materials.

12 Claims, No Drawings

SILANE TREATED ANTIMONY COMPOUNDS

BACKGROUND OF THE INVENTION

This invention relates to finely divided particulate inorganic antimony compounds, and more particularly, to antimony oxides and sulfides which are surface modified with up to about 5% by weight of an organo silane compound.

A number of antimony compounds have been used as flame-retardants for various organic resins and elastomers. One commonly used compound is antimony trioxide. One of the difficulties associated with the use of antimony compounds such as antimony oxides and antimony sulfides to improve the flame-retardant properties of flammable organic resins and elastomers is the degradation of some of the other desirable properties of the treated elastomers and resins. Although the incorporation of small amounts of antimony oxides and antimony sulfides in conjunction with organic flame-retardant compounds into flammable resins and elastomers has improved the flame-retardant properties of the resulting product, the incorporation of such antimony compounds often has an adverse effect on other properties of the resins and elastomers such as flexural strength, impact strength, tensile strength, flexural modulus and hardness.

The above-described adverse effects are not limited to the antimony oxides and sulfides. The literature describes procedures for filling thermoplastic and other polymers with many inorganic oxides, primarily as fillers. Examples of inorganic oxides which have been used as fillers for resins and elastomers include aluminum oxide, zinc oxide, iron oxide, magnesium oxide, titanium dioxide, silicates such as kaolin clay, mica, calcium silicate and aluminum silicate, calcium carbonate such as limestone, etc. In the initial development of this art, the inorganic oxide materials, in particulate form were introduced and blended into resins and elastomers. The resulting mixtures were molded by conventional methods such as casting, injection molding, extrusion or rotational molding to form inorganic oxide reinforced plastic articles. However, it generally was found that the properties of such filled articles were not as good as expected or desired.

Various suggestions have been made in the literature for improving the results obtained when such inorganic oxide materials are incorporated into resins and elastomers. A number of suggestions for overcoming these problems have involved the use of silicon-containing compounds, and particularly silane coupling agents.

U.S. Pat. No. 3,793,288, suggests that the bonding relationship between polymers and the inorganic oxides may be improved by treating the polymer itself, rather than by treatment of the inorganic oxide. Accordingly, U.S. Pat. No. 3,793,288 applies a surface on thermoplastic polymers which comprises an organofunctional silane coupling agent and a copolymer of ethylene and acrylic acid and/or methacrylic acid. It is reported that such coated polymers, when blended and molded in combination with particulate inorganic oxides yield significant improvements in processing and in properties.

Surface modification of powdered antimony oxide with silanes is described in an article published in *Applied Spectroscopy*, 29 (6), pages 512-7 (1975). The authors of this article describes the surface modification of antimony oxide with chlorosilanes or by dissolving antimony oxide in hydrochloric acid prior to a reaction with an aminosilane. The incorporation of these treated antimony oxides in epoxy resins or other organic formulations in amounts ranging from 10 to 100% by weight of the modified oxide is described.

U.S. Pat. No. 3,641,087 described the use of brominated silane derivatives in combination with metal oxides such as antimony oxides and organic antimonates as flame-retardant additives for synthetic polymer compositions. The separate addition of metal oxides such as antimony oxide and other additives such as silanes and diallyl chlorendates to diallylic phthalate resins is described in U.S. Pat. No. 3,483,158. Such compositions are reported to be flame-retardant.

Considerable effort has been devoted to improving the flame-retardant properties of resins and elastomers in recent years, and the above discussed prior art merely is exemplary of these efforts.

SUMMARY OF THE INVENTION

This invention relates to inorganic antimony compounds which have been surface modified with organosilanes and to the use of these surface modified antimony compounds for improving the flame-retardant properties of various resins and elastomers while minimizing the usual adverse effects on other properties. The surface modified antimony compounds of this invention comprise particulate inorganic antimony compounds which have been treated with up to about 5% by weight of an organosilane having the formula

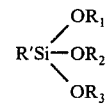

wherein $R_1$, $R_2$ and $R_3$, are each independently hydrogen, lower alkyl, lower alkenyl, alkoxyalkyl, aryl, lower alkylaryl, or lower arylalkyl groups, and R' is an organo functional group.

The improvement in the flame-retardant properties of resins and elastomers is obtained by the method which comprises incorporating the above-described surface modified antimony compound into the resin or elastomer in an amount which is effective to provide the desired flame-retardant properties. The use of the surface modified antimony compounds of this invention provides the desired improvement in flame-retardant properties while minimizing many of the adverse effects on some properties of the resulting product which otherwise may result from the use of the antimony compounds which are not surface modified in accordance with the invention.

DESCRIPTION OF THE PREFERRED EMBODIMENTS

The antimony compounds which are treated in accordance with the invention are antimony oxides and sulfides. The antimony oxide compounds which may be modified in accordance with this invention include antimony oxides such as antimony trioxide, antimony pentoxide, antimony tetroxide, antimony oxychlorides and metal antimonates such as hydrated potassium antimonate and sodium antimonate. Special pre-treatments of these antimony compounds is not required although it is preferred that the particulate antimony compounds be of suitable particle size range for incorporation into resins and elastomers in a normal manner. The presence of moisture on the surface of the particles is not detrimental and, in fact, may be preferred. Thus, hydrated antimony oxides are contemplated as being useful in the invention.

The improvements of this invention are obtained by modifying the surfaces of the particulate antimony compounds of the type described above with organo silanes having the formula

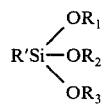

wherein $R_1$, $R_2$ and $R_3$ are each independently hydrogen, lower alkyl, lower alkenyl, alkoxyalkyl aryl, lower alkylaryl, or lower arylalkyl groups, and $R'$ is an organo functional group.

The lower alkyl and lower alkenyl groups generally contain from one to about five carbon atoms, and the preferred alkyl groups are methyl or ethyl. The alkoxyalkyl group also may contain from about one to about five carbon atoms in the alkoxy and in the alkyl portions of the group. Examples of alkoxyalkyl groups which are useful in the invention include methoxyethyl and ethoxyethyl. The aryl and alkylaryl groups preferably are phenyl groups which may contain substituents in addition to the lower alkyl groups defined above.

Examples of functional groups present in the organo functional group $R'$ include amino, mercapto, vinyl, epoxy, or acryloxy, and these functional groups preferably are attached to the silicon atom by a short aliphatic hydrocarbon chain. Thus, the organo functional group $R'$ may be an aminoalkyl, mercaptoalkyl, haloalkyl, epoxyalkyl, epoxyalkoxyalkyl or an acryloxyalkyl group.

Specific examples of silanes which are useful in the surface modifications of the invention include: vinyltrimethoxysilane; vinyltriethoxysilane; vinyltris(2-methoxyethoxy)silane; gamma-hydroxypropyltrimethoxysilane; gamma-hydroxypropyltriethoxysilane; gamma-methacryloxypropyltrimethoxysilane; beta-aminoethyltrimethoxysilane; gamma-aminopropyltriethoxysilane; N-beta-(aminoethyl)-gamma-aminopropyltrimethoxysilane; beta-(3,4-epoxy-cyclohexyl)ethyltrimethoxysilane; gamma-glycidoxypropyltrimethoxysilane, and gamma-mercaptopropyltrimethoxysilane. Other silanes described in U.S. Pat. No. 3,793,288 and in the following examples also are useful. Mixtures of two or more of these silanes can be used.

The preparation of amino organo silanes is described in, for example, U.S. Patent Nos. 2,832,754, 3,007,957 and 3,020,302. The organo silanes which are listed above are commercially available from sources such as Union Carbide Corporation, New York, N.Y., from Dow Corning Corporation, Midland, Michigan, and others.

The surface modified antimony compounds of this invention can be prepared by dissolving the desired amount of silane or mixture of silanes in a suitable solvent and thereafter blending the antimony compound with the dissolved silane. Alcohols such as methanol are useful as solvents. Alternatively, the silane may be mixed with water or a water:alcohol mixture which is then blended with the antimony compound. Another method for accomplishing the surface modification of the antimony compounds is to intimately mix the desired amount of silane with the antimony compound in the absence of added solvents. The amount of silane added to the antimony compounds can be varied but generally will be no more than about 5% by weight based on the weight of the antimony compound. When water or solvent is utilized to facilitate the coating of the antimony compounds, the product is subjected to a drying cycle to remove the water and/or solvent. Drying times of up to about four or five hours at temperatures of about 120°–130° C have provided satisfactory results.

The following examples illustrate typical methods for preparing particulate inorganic antimony compounds which have been surface modified with a silane. Unless otherwise indicated, all parts and percentages are by weight.

EXAMPLE 1

A solution of 15 grams of gamma-chloropropyltrimethoxysilane (available from Union Carbide Corp. under the designation "Silane A-143") and 60 ml. of methanol is prepared and added to 300 grams of powdered antimony trioxide with vigorous agitation. The mixture then is dried in an oven maintained at 120° C for 2 hours. The solid material is ground to a powder.

EXAMPLE 2

Fifteen grams of vinyltriethoxysilane (available from Union Carbide Corp. under the designation "Silane A-151") are dissolved in 25 ml. of methanol, and the solution is added dropwise to 300 grams of antimony trioxide powder with vigorous agitation over a period of six minutes. This mixture is heated to 60° C and maintained at this temperature to provide a total stirring time of one hour. The product is dried in an oven at 120° C for 4 hours.

EXAMPLE 3

Fifteen grams of vinyl-tris(2-methoxyethoxy)silane (available from Union Carbide Corp. under the designation "Silane A-172") is dissolved in 25 ml. of methanol and the solution is added to 300 grams of powdered antimony trioxide over a period of 16 minutes with vigorous agitation. After stirring for about 13 minutes, the mixture is transferred to a glass jar which is tumbled on a roller mill for one hour. This material then is dried in an oven at 120° C for 4 hours.

EXAMPLE 4

Fifteen grams of gamma-glycidoxypropyltrimethoxysilane are dissolved in 25 ml. of methanol, and the solution is added to 300 grams of powdered antimony trioxide with vigorous agitation over a period of about 17 minutes. The mixture is stirred an additional hour and then dried at 120° C for 4 hours.

EXAMPLE 5

Fifteen grams of gamma-mercaptopropyltrimethoxysilane (available from Union Carbide Corp. under the designation "Silane A-189") is dissolved in 25 ml. of methanol, and the solution is added to 300 grams of powdered antimony oxide over a period of 16 minutes with vigorous agitation. After stirring for an additional 13 minutes, the mixture is transferred to a glass jar and tumbled on a roller mill for 1 hour. The product is dried for 4 hours at 120° C.

EXAMPLE 6

Fifteen grams of N-β-(aminoethyl)-gamma-aminopropyltrimethoxysilane (available from Union Carbide Corp. under the designation "Silane A-1120") are dissolved in 25 ml. of methanol, and the solution is added with vigorous stirring to 300 grams of antimony trioxide over a period of 15 minutes. Stirring is continued for five minutes, and the mixture is transferred to a glass jar and tumbled for one hour on a roller mill. The product is dried for 4 hours at 120° C.

EXAMPLE 7

A mixture of 15 grams of the silane utilized in Example 6, 22.5 ml. of methanol and 2.5 ml. of water is prepared and added with vigorous agitation to 300 grams of antimony trioxide over a period of 10 minutes. After stirring an additional 15 minutes, the mixture is transferred to a glass jar and tumbled on a roller mill. The product is dried for four hours at 120° C.

EXAMPLE 8

A mixture of 15 grams of gamma-methacryloxypropyltrimethoxysilane, 22.5 ml. of methanol and 2.5 ml. of water is prepared and added to 300 grams of powdered antimony trioxide with vigorous agitation over a period of 18 minutes. After stirring an additional 5 minutes, the mixture is transferred to a glass jar and tumbled for 1 hour. The product is dried at 120° C for 4 hours.

EXAMPLE 9

A mixture of 15 grams of gamma-aminopropyltriethoxysilane (available from Union Carbide Corp. under the designation "Silane A-1100"), 22.5 ml. of methanol and 2.5 ml. of water is prepared and added to 300 grams of powdered antimony trioxide over a period of 17 minutes. After stirring an additional five minutes, the mixture is transferred to a jar and tumbled for 1 hour on a roller. The product is dried at 120° C for 4 hours.

EXAMPLE 10

A mixture of 15 grams of the silane utilized in Example 8, 100 ml. of water and two to three grams of acetic acid is prepared and added to a slurry of 300 ml. of water and 300 grams of antimony trioxide over a period of ten minutes. This slurry is stirred an additional 0.5 hour, and the product is dried for 5 hours at 120° C to a constant weight.

EXAMPLE 11

A mixture of 15 grams of the silane of Example 9 and 25 ml. of anhydrous methanol is prepared and added in 17 minutes with vigorous agitation to 300 grams of antimony trioxide. After stirring an additional six minutes, the mixture is tumbled in a glass jar for 1 hour on a roller mill. The desired product is obtained on drying.

EXAMPLE 12

A mixture of 30 grams of the silane of Example 8 and 300 ml. of 90% aqueous methanol is prepared, and 300 grams of antimony trioxide is added over a period of three minutes. This slurry is heated for 3 hours and dried first at a temperature of 80° C and then for 1 hour at 120° C.

EXAMPLE 13

A mixture of ten ml. of anhydrous methanol and 15 grams of a silane having the structure

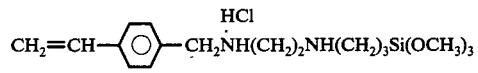

is added to 300 grams of antimony trioxide with vigorous stirring over a period of 13 minutes. After stirring an additional six minutes, the mixture is transferred to a jar and rolled on a mill for about 1 hour. The product is dried at 120°-125° C.

EXAMPLE 14

Into a Twin-Shell Blender (available from the Patterson-Kelly Company Inc., East Stroudsberg, Pennsylvania) there is added 6,820 grams of powdered antimony trioxide, and a solution of 68.2 grams of the silane of Example 8 dissolved in 250 ml. of methanol is added over ten minutes. After blending for an additional five minutes, the product is recovered from the blender and dried in an oven at 105° C for 3 hours.

EXAMPLE 15

Antimony trioxide (6,000 grams) is added to a Twin-Shell Blender of the type described in Example 14 and 300 grams of the silane described in Example 9 is added over a period of 13 minutes. The lines are rinsed with 50 ml. of methanol and blown with air. Blending is continued for 5 minutes and the product is transferred to drying trays and dried in an oven at 105° C for 3 hours.

EXAMPLE 16

A mixture of 450 grams of powdered antimony trioxide and 4.5 grams of β-(3,4-epoxycyclohexyl)ethyltrimethoxysilane (available from Union Carbide Corp. under the designation "Silane A-186") is stirred briefly in a jar and then mixed on a tumble roll for 1 hour. The desired product is recovered from the jar.

EXAMPLE 17

The procedure of Example 16 is repeated except that the silane of Example 5 is utilized in lieu of the "Silane A-186".

EXAMPLE 18

The procedure of Example 16 is repeated except that the silane utilized in this Example is the silane described in Example 9.

EXAMPLE 19

A mixture of 200 grams of antimony pentoxide and two grams of the silane utilized in Example 8 is tumbled on a fast jar mill for one hour and the desired powdered product is obtained on drying.

EXAMPLE 20

The procedure of Example 19 is repeated except that the mixture comprises 100 grams of antimony pentoxide and one gram of the silane of Example 9.

EXAMPLE 21

The procedure of Example 2 is repeated except that the silane utilized in this Example is N,N-di-beta(hydroxyethyl)-gamma-aminopropyltriethoxysilane (available from Union Carbide Corp. under the designation "Silane A-111").

EXAMPLE 22

The procedure of Example 2 is repeated except that the silane utilized in this Example is the silane having the following structure CH₃OC(O)CH₂CH₂NHCH₂CH₂NH(CH₂)-₃Si(OCH₃)₃ which is available from Union Carbide Corp. under the designation "Silane A-1125".

EXAMPLE 23

The procedure of Example 2 is repeated except that the antimony compound utilized in this Example is hydrated potassium antimonate [$KSb(OH_6)$].

EXAMPLE 24

The procedure of Example 2 is repeated except that the antimony compound utilized in this Example is antimony oxychloride.

EXAMPLE 25

The procedure of Example 2 is repeated except that the antimony oxide is replaced by an equivalent amount of antimony trisulfide.

The surface modified antimony compounds of this invention are particularly useful as additives to organic resins and elastomers for improving the flame-retardant properties of these materials when utilized in combination with known organic flame-retardant compositions. The use of combinations of organic flame-retardant compositions with inorganic antimony compounds such as antimony oxides and sulfides to improve the flame-retardant properties of resins and elastomers is known but, as mentioned above, the incorporation of antimony oxide or antimony sulfide generally has adverse effects on a number of the other desirable properties of the resins and elastomers such as strength, hardness, elongation, etc. It now has been found that the particulate inorganic antimony compounds which have been treated with silanes in accordance with the invention improve the flame-retardant properties of these resins and elastomers, and further, provide these desirable results while minimizing or overcoming the normal adverse effects of such antimony compounds.

The surface modified antimony compounds of the invention can be utilized in a wide variety of organic resins and elastomers. Examples of thermosetting resins which can be treated with the antimony compounds of the invention include: phenolic resins, alkyd resins, epoxy resins, polybutadiene resins, polyester resins, crosslinked polyethylene resins, urethanes and polyimides resins. Examples of thermoplastic resins include: polyamides, ABS, polycarbonates, polyesters, polyethylenes, polypropylenes, polystyrene and polyvinyl chlorides. A number of elastomeric materials can be treated with the surface modified antimony compounds and these include: neoprene, nitriles, polybutadienes, polyisoprenes, polysulfides, SBR, and urethanes.

The surface modified antimony compounds of this invention can be incorporated into the above resins and elastomers at any suitable stage in the manufacture of the polymer composition. Thus, the antimony compounds may be added to a monomer prior to polymerization or, as may often be more convenient, to an already formed polymer. Other conventional consituents of polymer compositions such as fillers, plasticizers, pigments and stabilizers also may be incorporated in amounts which are well known to those skilled in the art to provide various desirable properties.

The amount of the surface modified antimony compound incorporated into the organic resins and elastomers can vary over a wide range depending upon the type of resin and the other ingredients of the resin or elastomer. Generally, amounts up to about 15% by weight of the surface modified antimony compounds can be incorporated into the organic resin or elastomer.

The following examples illustrate resin and elastomer systems containing the treated antimony compounds of the invention:

|  | Parts by Weight |
|---|---|
| Example A |  |
| Polyester Resin "Paraplex" P-43 (available from Rohm & Haas) catalyzed with 1% "Luperco" ATC, an organic peroxide from Wallace and Tiernan, Inc. Lucidol Division | 50 |
| Product of Example 2 | 5 |
| Halogen-containing flame-retardant | 5 |
| Clay | 40 |
| Example B |  |
| "Paraplex" P-43 catalyzed with 1% "Luperco" ATC | 50 |
| Product of Example 8 | 5 |
| Halogen-containing flame-retardant | 5 |
| Clay | 40 |
| Example C |  |
| Polypropylene resin 5524-1 (from Shell Chemical Co.) | 50 |
| Clay | 41 |
| Product of Example 8 | 5 |
| Halogen-containing flame-retardant | 4 |

The embodiments of the invention in which an exclusive property or privilege is claimed are defined as follows:

1. A finely divided particulate inorganic antimony compound surface modified with up to about 5% by weight of an organosilane having the formula

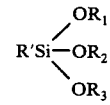

wherein $R_1$, $R_2$ and $R_3$ are each independently hydrogen, lower alkyl, lower alkenyl, alkoxyalkyl aryl, lower alkylaryl, or lower arylalkyl groups, and R' is an organo functional group.

2. The compound of claim 1 wherein the organo functional group is aminoalkyl, mercaptoalkyl, haloalkyl, epoxyalkyl, epoxyalkoxyalkyl, acryloxyalkyl or a vinyl functional group.

3. The compound of claim 1 wherein the organo functional group R' further is represented by the formula

X-(CH₂)₃ wherein X is an amino, mercapto, halogen, epoxy or ester group.

4. The compound of claim 1 wherein the inorganic antimony compound is an antimony oxide.

5. The compound of claim 1 wherein the inorganic antimony compound is an antimony sulfide.

6. The compound of claim 1 wherein $R_1$, $R_2$ and $R_3$ are methyl or ethyl groups and R' is an amino propyl group.

7. The compound of claim 1 wherein the inorganic antimony compound is an antimony oxide, antimony oxychloride, or a metal antimonate.

8. A method for improving the flame-retardant properties of organic resins and elastomers comprising incorporating into said resin or elastomer, an amount of the surface modified antimony compound of claim 1 effective to improve the flame-retardant properties.

9. The method of claim 8 wherein the resin is a thermoplastic resin.

10. The method of claim 8 wherein up to about 15% by weight of the surface modified antimony compound is incorporated into the resin or elastomer.

11. The method of claim 8 wherein the antimony compound is an antimony oxide.

12. An organic resin or elastomer containing up to about 15% by weight of the surface modified antimony compound of claim 1.

* * * * *